INVENTOR.
STANLEY N. JOHNSON
BY
Carroll R. Taber
ATTORNEY.

June 21, 1938. S. N. JOHNSON 2,121,199
METHOD OF MANUFACTURING VEHICLE WHEELS
Filed July 8, 1935 2 Sheets-Sheet 2
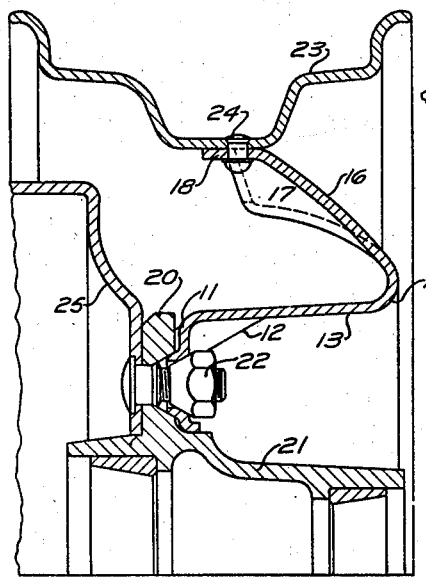
FIG. 15
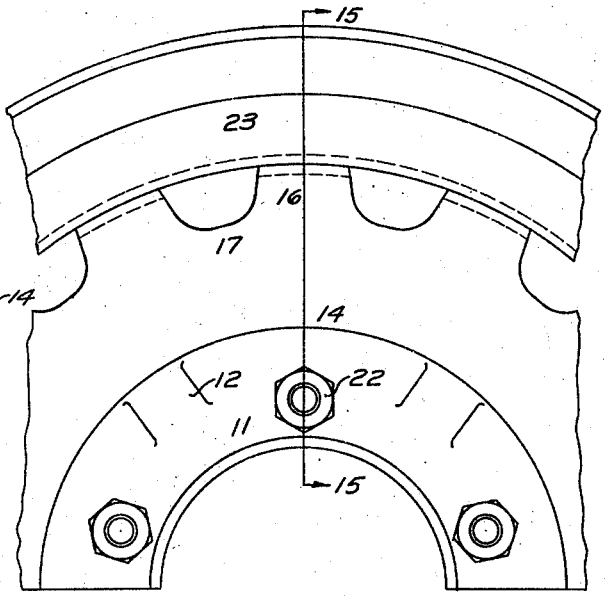
FIG. 16
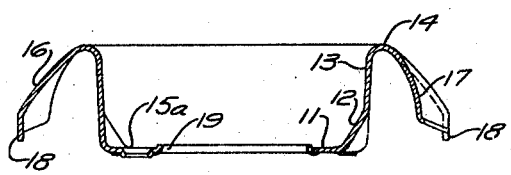
FIG. 14.
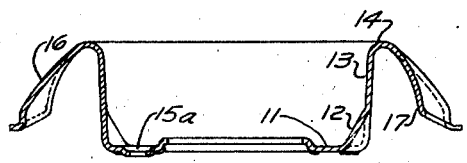
FIG. 12
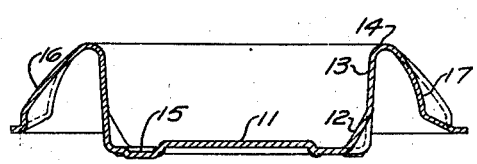
FIG. 10
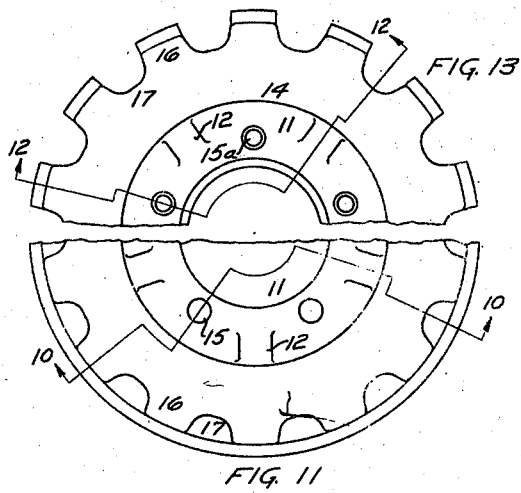
FIG. 13
FIG. 11
INVENTOR.
STANLEY N. JOHNSON
BY
Carroll R. Taber
ATTORNEY.

Patented June 21, 1938

2,121,199

UNITED STATES PATENT OFFICE 2,121,199

METHOD OF MANUFACTURING VEHICLE WHEELS

Stanley N. Johnson, Lansing, Mich., assignor to Motor Wheel Corporation, Lansing, Mich., a corporation of Michigan Application July 8, 1935, Serial No. 30,285

2 Claims. (Cl. 29—159.03)

This invention relates to the manufacture of vehicle wheels and more particularly to the method of manufacturing one piece metallic wheel bodies. An important object of the invention is the provision of a method for producing one piece wheel bodies which are of substantially uniform thickness throughout and which are free from wrinkles, cracks, etc. These objects are obtained by the method hereinafter described, the various steps of which are illustrated in the accompanying drawings wherein:

Figures 10 and 11 show the blank after the operation producing the spoke formations in rough form;

Figures 12 and 13 show the blank after the removal of a portion of the metal between the spokes;

Figure 14 shows the finished wheel body; and

Figures 15 and 16 show partial sectional and elevational views of a complete wheel incorporating the wheel body of Figure 14.

Figure 1:
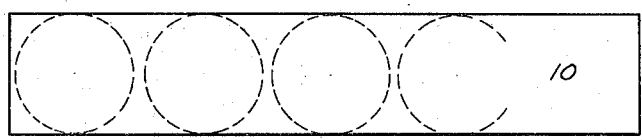
Figure 1 shows a strip of steel from which circular blanks are formed.
Figure 2:
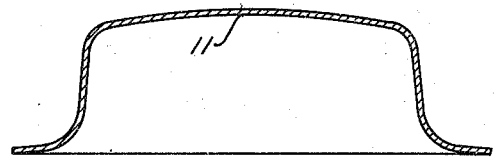
Figure 2 is a sectional view of a circular blank after the first deforming operation.
Figure 3:
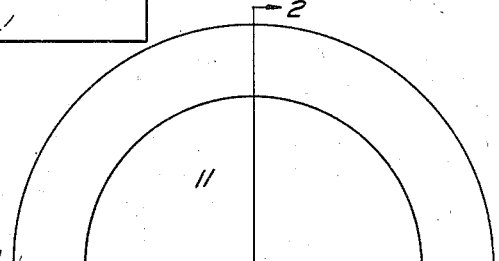
Figure 3 is a partial plan view of the blank shown in Figure 2.
Figure 4:
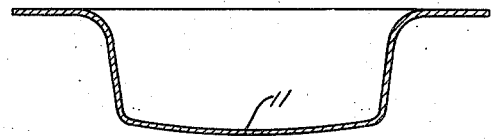
Figure 4 is a sectional view of the blank after the second deforming operation.
Figure 5:
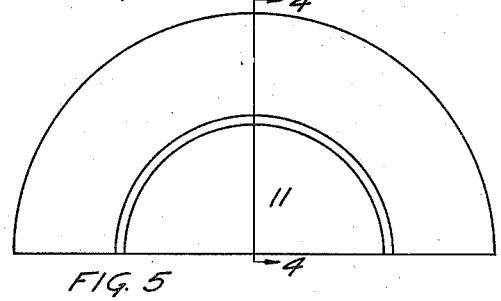
Figure 5 is a plan view of the blank shown in Figure 4.

The metal from which the wheel body is formed is supplied in the form of strip stock 10 of the shape illustrated in Figure 1. Circular blanks of the form indicated in dotted lines in Figure 1 are cut from this blank. At the same time the circular blanks are cut the first deforming operation may be performed upon the blank. This operation consists in pressing a central annular portion 11 to one side of the original plane of the blank, as shown in Figures 2 and 3. The next operation consists in pressing the central portion 11 to the opposite side of the blank, as shown in Figures 4 and 5. By first pressing the central zone of the metal to one side of the blank and then to the other side of the blank the metal of the blank is flowed or gathered to enable the formation of the structure shown in Figures 4 and 5 without appreciably thinning the metal. As shown in Figure 4 the central portion 11 constitutes a bolting on flange in rough form lying in a plane spaced a substantial distance from the original plane of the blank. It will be observed that the diameter of the central portion 11 in Figure 4 is substantially less than the diameter of this portion in Figure 2.

Figure 6:
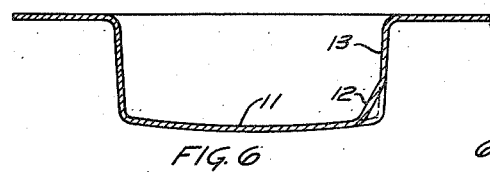
Figures 6 and 7 are sectional and plan views of the blank after one of the intermediate operations.
Figure 7:
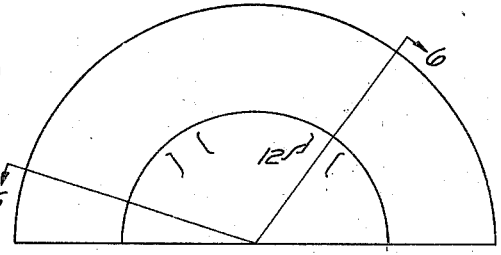

Figures 6 and 7 show the blank after the structure of Figure 4 has been operated upon to size the center and produce the strengthening ribs 12 between the bolting on flange 11 and the cylindrical portion 13. After this sizing and ribbing operation the blank is next subjected to a flanging and embossing operation producing the structure shown in Figures 8 and 9. The flanging operation consists in pressing the radially outermost portion of the blank away from the original plane of the blank in the same direction as the bolting on flange 11, while maintaining an intermediate annular zone 14 in the original plane of the blank. The embossing operation consists in providing the bosses 15 which are subsequently pierced to provide bolt holes.

Figure 8:
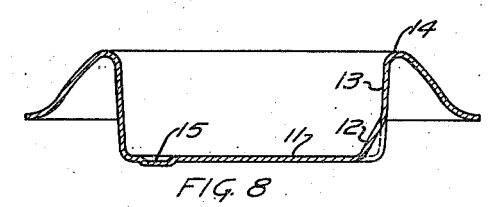
Figures 8 and 9 show the blank after the periphery thereof has been pressed to one side of the original plane of the blank preparatory to the formation of the spoke portions.
Figure 9:
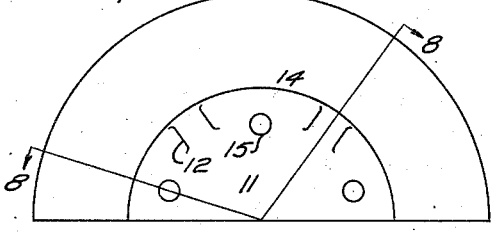

The blank of Figure 8 is next operated upon to produce the spoke-like ribs 16 with valleys 17 therebetween and the bolting on portion 11 is reshaped, all as shown in Figures 10 and 11. In the formation of the spoke ribs 16 and valleys 17 the metal in spaced radial zones is simultaneously pressed in one direction to produce the ribs 16 and in the other direction intermediate said zones to produce the valleys 17. By pressing the metal in these alternate zones in opposite directions the tendency of the metal to wrinkle adjacent the spoke-like ribs is eliminated, the effect of these simulatoneus operations being the equivalent of ironing the metal out.

Figures 12 and 13 illustrate the blank after the next succeeding operation which includes cutting away a portion of the periphery of the blank in the region of the valleys 17 to separate the outer extremities of the spokes 16 and piercing the boss 15 to provide the bolt opening 15a. The last operation consists of flanging the outer extremities of the spokes 16 to produce the rim seats 18, and forming the central hub receiving opening 19 in the bolting on flange portion 11 as shown in Figure 14. The wheel body is then ready for assembly in a wheel.

The manner in which the one piece wheel body of Figure 14 is assembled in a wheel is illustrated in Figures 15 and 16. As there shown the wheel body is attached to the radial flange 20 of a conventional hub 21 by a stud bolt assembly 22 engaging the bolting on flange 11 through the openings 15a. A rim 23 is attached to the flanges 18 of spokes 16 in any conventional manner as by the rivets 24. A brake drum 25 may be secured to the hub flange 20 as shown.

In carrying out the method herein described suitable fixtures, dies, punches, etc. will be required. The nature of each particular operation will determine largely the shape or contour of the conventional form of instrumentality needed for that operation. This required shape or contour will be apparent to those skilled in the wheel making art from an inspection of the attached drawings showing the result of each of the various operations. These instrumentalities will of course be assembled and operated in a conventional manner which is also well known to those skilled in the art.

From the foregoing description it will be apparent that the present invention provides a method of forming a one piece wheel body having a bolting on flange spaced axially inwardly a substantial distance from the axially outermost portion of the wheel, and provided in its peripheral zone with spokes having unconnected outer extremities separated from each other by axially inwardly extending valleys. Likewise, it will be apparent that the present invention makes possible the production of such a wheel body which is free from wrinkles and the like, and which is of substantially uniform thickness throughout whereby localized regions of weakness are avoided.

The scope of the invention is indicated in the appended claims.

1. The method of manufacturing one piece wheel bodies which includes the steps of pressing the central portion of a circular metal blank to one side of the original plane of the blank, repressing said central portion of the blank to provide a central bolting-on flange portion lying in a plane parallel to and spaced substantially from the original plane of the blank but on the opposite side thereof, pressing the periphery of the blank away from the original plane of the blank toward the plane of the bolting on flange, and thereafter deforming the periphery of the blank to provide a plurality of circumferentially spaced axially extending rim seats.

2. The method of manufacturing one piece wheel bodies which includes the steps of pressing the central portion of a circular metal blank to one side of the original plane of the blank, repressing said central portion to the opposite side of the blank to provide a central bolting on flange portion lying in a plane parallel to and spaced substantially from the original plane of the blank, pressing the periphery of the blank away from the original plane of the blank toward the plane of the bolting on flange, and thereafter deforming the periphery of the blank to adapt it for attachment to a rim.

STANLEY N. JOHNSON.